(12) United States Patent
Nakayama et al.

(10) Patent No.: US 12,189,446 B2
(45) Date of Patent: Jan. 7, 2025

(54) METHOD FOR ADDRESSING POWER OUTAGE, ARITHMETIC LOGIC APPARATUS

(71) Applicant: Hitachi, Ltd., Tokyo (JP)

(72) Inventors: Sotaro Nakayama, Tokyo (JP); Takashi Okada, Tokyo (JP); Naoya Okamura, Tokyo (JP)

(73) Assignee: Hitachi Vantara, Ltd., Kanagawa-ken (JP)

( * ) Notice: Subject to any disclaimer, the term of this patent is extended or adjusted under 35 U.S.C. 154(b) by 56 days.

(21) Appl. No.: 18/118,324

(22) Filed: Mar. 7, 2023

(65) Prior Publication Data

US 2024/0168532 A1 May 23, 2024

(30) Foreign Application Priority Data

Nov. 18, 2022 (JP) .................................. 2022-185124

(51) Int. Cl.
*G06F 1/26* (2006.01)
*G06F 1/30* (2006.01)
(Continued)

(52) U.S. Cl.
CPC ................ *G06F 1/263* (2013.01); *G06F 1/30* (2013.01); *G06F 1/3212* (2013.01); *G06F 1/3243* (2013.01); *G06F 1/3287* (2013.01); *G06F 11/1441* (2013.01); *G06F 11/1458* (2013.01); *G06F 11/2015* (2013.01); *G06F 2201/84* (2013.01)

(58) Field of Classification Search
CPC .......... G06F 1/236; G06F 1/30; G06F 1/3243; G06F 1/3287; G06F 11/1441; G06F 11/1458; G06F 1/3212; G06F 11/2015; G06F 2201/84
See application file for complete search history.

(56) References Cited

U.S. PATENT DOCUMENTS 8,200,929 B1 *  6/2012  Sartore .............. G06F 12/0868
714/24
9,251,047 B1 *  2/2016  McKelvie ............... G06F 21/85
(Continued)

FOREIGN PATENT DOCUMENTS

EP          3073605 A2 *  9/2016  .............. G06F 1/30
JP       2006-031630 A      2/2006

*Primary Examiner* — Glenn A. Auve
(74) *Attorney, Agent, or Firm* — Procopio, Cory, Hargreaves & Savitch LLP

(57) ABSTRACT

A method for addressing power outage of an arithmetic logic apparatus including an arithmetic logic part, a power supply port to which power is externally supplied, and a battery, the arithmetic logic part including a primary system device and a secondary system device, the method includes detection processing of detecting disruption of power in the power supply port, supplying processing of supplying power from the battery to the arithmetic logic part when the disruption is detected in the detection processing, end processing of performing processing of ending the secondary system device to reduce power consumption of the secondary system device when the supplying processing is performed, and backup processing of performing data backup using the primary system device upon completion of the end processing.

6 Claims, 5 Drawing Sheets

(51) Int. Cl.
  *G06F 1/3212* (2019.01)
  *G06F 1/3234* (2019.01)
  *G06F 1/3287* (2019.01)
  *G06F 11/14* (2006.01)
  *G06F 11/20* (2006.01)

(56) References Cited

U.S. PATENT DOCUMENTS

| | | |
|---|---|---|
| 2006/0020855 A1 | 1/2006 | Okada et al. |
| 2010/0299541 A1* | 11/2010 | Ishikawa ............... G06F 9/4893 713/300 |
| 2011/0252260 A1* | 10/2011 | Flachs ..................... G06F 1/329 713/324 |
| 2012/0159210 A1* | 6/2012 | Hosaka ................. G06F 1/3268 713/320 |
| 2016/0179640 A1* | 6/2016 | Murata ............... G06F 11/2015 714/14 |
| 2018/0232307 A1* | 8/2018 | Oota ................. G06F 11/0778 |
| 2019/0108101 A1* | 4/2019 | Wu ....................... G06F 3/0647 |
| 2019/0250688 A1* | 8/2019 | Alaqeel ................... G06F 1/263 |
| 2020/0106890 A1* | 4/2020 | Chan ................... G06F 11/3062 |
| 2023/0043379 A1* | 2/2023 | Guyer ................. G06F 11/1446 |

* cited by examiner

METHOD FOR ADDRESSING POWER OUTAGE, ARITHMETIC LOGIC APPARATUS

BACKGROUND OF THE INVENTION

Field of the Invention

The present invention relates to a method for addressing power outage and an arithmetic logic apparatus for executing the method for addressing power outage.

Description of the Related Art

Power is essential for operating a computer, but it is difficult to completely avoid power supply stoppage, and power outage needs to be addressed. Japanese Patent Laid-Open No. 2006-031630 discloses a storage apparatus including: a communication control part that is coupled to each of a host apparatus and a memory device and that controls each exchange of data with the host apparatus and the memory device; a memory part that is used in the communication control part; and an apparatus power supply part that supplies a specified power to each of the communication control part and the memory part, the communication control part including: a host interface control part that controls the exchange of data with the host apparatus; a slave interface control part that controls the exchange of data with the memory device; and an internal power supply control part that controls the supply of power to the host interface control part and the slave interface control part, in which when a trouble is detected in the supply of power to the communication control part by the apparatus power supply part, the communication control part separately controls the supply of power to the host interface control part and the slave interface control part in accordance with the respective states of execution of first end processing that is performed by the host interface control part and second end processing that is performed by the slave interface control part.

The invention described in Japanese Patent Laid-Open No. 2006-031630 still needs to improve the processing at power outage. In particular, there is a demand for a method and an arithmetic logic apparatus for further reducing power consumption during operation under power outage.

SUMMARY OF THE INVENTION

According to the 1st aspect of the present invention, a method for addressing power outage of an arithmetic logic apparatus including an arithmetic logic part, a power supply port to which power is externally supplied, and a battery, the arithmetic logic part including a primary system device and a secondary system device, the method includes detection processing of detecting disruption of power in the power supply port, supplying processing of supplying power from the battery to the arithmetic logic part when the disruption is detected in the detection processing, end processing of performing processing of ending the secondary system device to reduce power consumption of the secondary system device when the supplying processing is performed, and backup processing of performing data backup using the primary system device upon completion of the end processing.

According to the 2nd aspect of the present invention, an arithmetic logic apparatus includes an arithmetic logic part including a primary system device and a secondary system device, a power supply port to which power is externally supplied, a battery, a power supply control part that supplies power from the battery to the arithmetic logic part when disruption of power is detected in the power supply port, and a central processing part that performs processing of ending the secondary system device to reduce power consumption of the secondary system device when the arithmetic logic part is supplied with power from the battery so as to perform data backup using the primary system device.

According to the present invention, power consumption during backup processing after power outage can be reduced.

DETAILED DESCRIPTION OF THE PREFERRED EMBODIMENT

Embodiment

Hereinafter, an embodiment of a method for addressing power outage and an arithmetic logic apparatus will be described with reference to FIG. 1 to FIG. 5.

Figure 1:
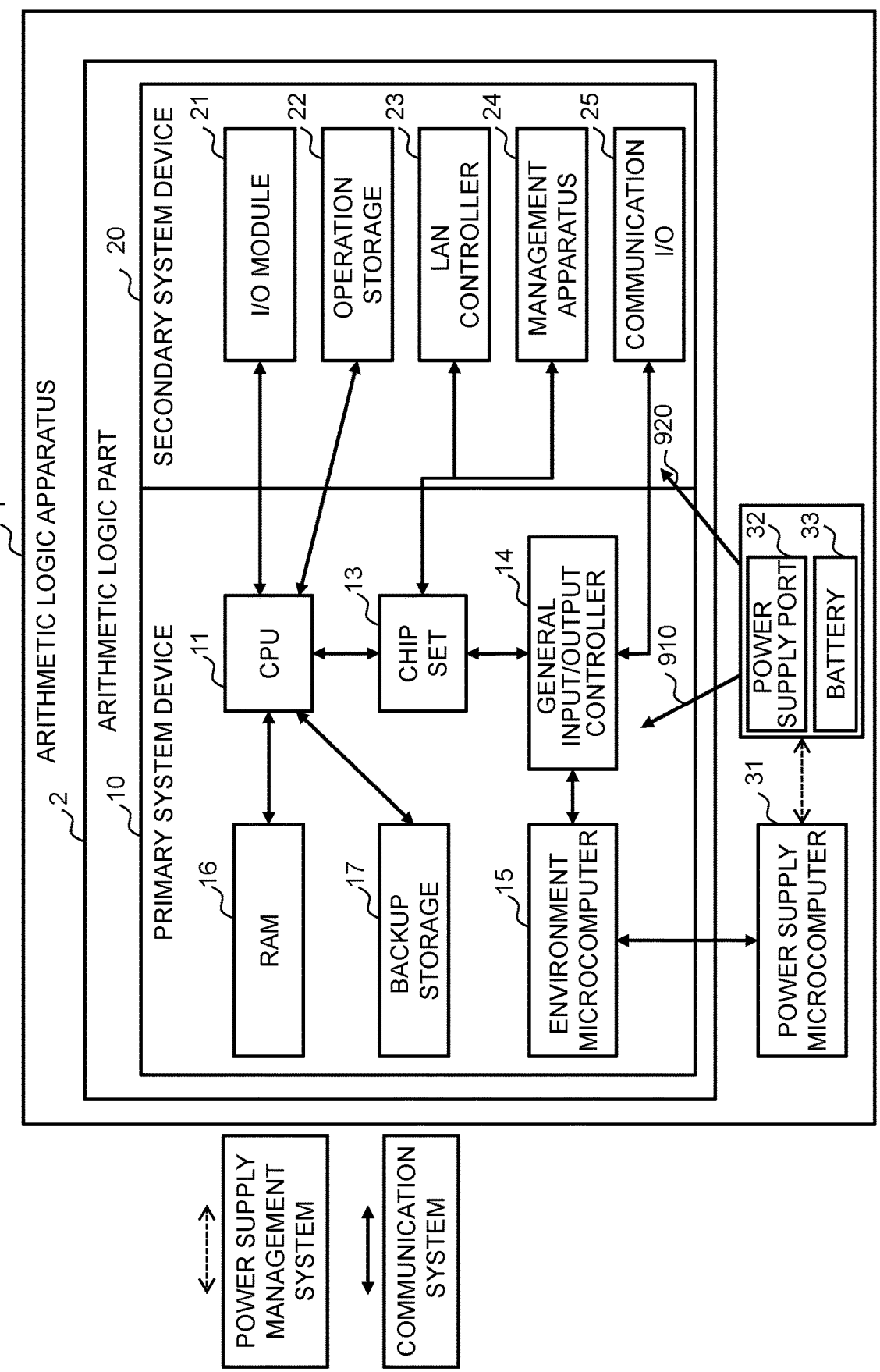
FIG. 1 is a configuration diagram of an arithmetic logic apparatus.

FIG. 1 is a configuration diagram of an arithmetic logic apparatus 1. The arithmetic logic apparatus 1 includes an arithmetic logic part 2, a power supply microcomputer 31, a power supply port 32, and a battery 33. The arithmetic logic part 2 includes a primary system device 10 and a secondary system device 20. The primary system device 10 and the secondary system device 20 are named for convenience, and are distinguished from each other in terms of backup processing described later. The primary system device 10 includes a CPU 11, a chip set 13, a general input/output controller 14, a surrounding environment-related microcomputer 15, a RAM 16, and a backup storage 17. The secondary system device 20 includes an I/O module 21, an operation storage 22, a LAN controller 23, a management apparatus 24, and a communication I/O 25.

The power supply microcomputer 31 is a microcomputer that controls power supply of the arithmetic logic apparatus 1. The power supply microcomputer 31 is a microcomputer including one semiconductor chip. However, "microcomputer" is named for convenience, and the power supply microcomputer 31 may include a single board computer or an FPGA. The power supply port 32 is a supply port to which power is externally supplied. A commercial power or a direct current power generated outside the arithmetic logic apparatus 1 may be input to the power supply port 32. The power is externally supplied to the power supply port 32, but the power supply is occasionally stopped as will be described later.

Hereinafter, the state with no power externally supplied to the power supply port 32 is referred to as "power outage," while the state with power externally supplied to the power supply port 32 is referred to as "non-power outage." The power input to the power supply port 32 is supplied to the primary system device 10 and the secondary system device 20. The arithmetic logic apparatus 1 includes primary system wiring 910 that is power wiring for the primary system device 10 and secondary system wiring 920 that is power wiring for the secondary system device 20. With the power wiring for the two systems, collective halting of power supply to the secondary system device 20, which will be described later, can be easily realized.

The battery 33 can supply power to the primary system device 10 and the secondary system device 20 based on an operation command of the power supply microcomputer 31. However, since the power stored in the battery 33 is limited, the arithmetic logic apparatus 1 cannot be operated for a long duration. There are cases in which the battery 33 supplies power to both the primary system device 10 and the secondary system device 20, supplies power only to the primary system device 10, or supplies power to neither of the devices. The configuration is made such that the destination of the power to be supplied by the battery 33 is selectable by a relay operated by the power supply microcomputer 31, for example.

The CPU 11 is a central processing unit. The CPU 11 develops programs in the RAM 16 to execute the programs. The programs executed by the CPU 11 include an operation program to be executed during non-power outage, a power outage response program to be executed during power outage, an operating system (OS), and a BIOS or an EFI (Extensible Firmware Interface). The operation program and the OS are stored in, for example, the operation storage 22 and the power outage response program is stored in the backup storage 17. The BIOS or the EFI are stored in a ROM (not shown) included in the primary system device 10. The CPU 11 has interruption setting at the time of execution of the operation program, and upon receipt of an interruption notice, which will be described later, from the power supply microcomputer 31, starts processing at power outage which will be described later.

The chip set 13 is a Platform Controller Hub. The chip set 13 is a chip set mounted on a mother board, and couples the CPU 11 and the other apparatuses. Note that in FIG. 1, the RAM 16, the backup storage 17, the I/O module 21, and the operation storage 22 are directly coupled to the CPU 11, but these may be coupled to the CPU 11 via the chip set 13. The general input/output controller 14 is a controller that performs a relatively low-speed data communication. The general input/output controller 14 communicates with the CPU 11 via the chip set 13.

The surrounding environment-related microcomputer 15 is a microcomputer and collects surrounding information of the arithmetic logic part 2. The surrounding environment-related microcomputer 15 communicates with the power supply microcomputer 31. That is, the CPU 11 communicates with the power supply microcomputer 31 via the chip set 13, the general input/output controller 14, and the surrounding environment-related microcomputer 15. However, this configuration is an example, and it is not an essential configuration that the chip set 13, the general input/output controller 14, and the surrounding environment-related microcomputer 15 are interposed for the communication between the CPU 11 and the power supply microcomputer 31.

The RAM 16 is a volatile memory that is readable at a high speed. The RAM 16 stores various data used by the CPU 11. However, since the RAM 16 is volatile, the stored data is lost when power supply is stopped. Therefore, at power outage, backup processing is performed as will be described later. The backup storage 17 is a non-volatile memory apparatus, for example, a hard disk drive. The backup storage 17 may be in a redundancy configuration for improving safety. The backup storage 17 is used as a destination of data to be stored in the backup processing executed at power outage. Note that the power outage response program that executes the backup processing may be stored in the backup storage 17 or may be stored in another memory apparatus, for example, the operation storage 22 or a ROM (not shown).

The I/O module 21 is an interface coupled to peripheral apparatuses, and is, for example, a PCI Express controller, a serial ATA controller, a RAID controller, and an SCSI controller. The peripheral apparatuses (not shown) are coupled to the I/O module 21. The operation storage 22 is a non-volatile memory apparatus, for example, a hard disk drive. The operation storage 22 stores the operation programs executed by the CPU 11 during non-power outage, the operating system, and data used in the operation programs. Note that the operation program is named for convenience to simply show that the operation program is irrelevant to the above-described backup processing, and the processing content is not limited. The main purpose of the arithmetic logic apparatus 1 is to execute the operation programs.

The LAN controller 23 is, for example, an IEEE 802.3-compliant network interface card. The management apparatus 24 is a module for externally managing the arithmetic logic apparatus 1. The management apparatus 24 may only have a function of outputting information of the arithmetic logic apparatus 1 or may have a function of outputting an externally input command to the CPU 11. The communication I/O 25 is a module for realizing a relatively low-speed communication with the outside of the arithmetic logic apparatus 1. The communication I/O 25 realizes, for example, a serial communication or a parallel communication. The specific configurations of the primary system device 10 and the secondary system device 20 described so far are mere examples, and other configurations may be further included.

For each apparatus of the secondary system device 20, end processing can be executed with the operating system started. For example, a device driver corresponding to a soft reset is prepared in advance, and after performing the end processing, the only power supply to the secondary system device 20 can be safely halted.

Figure 2:
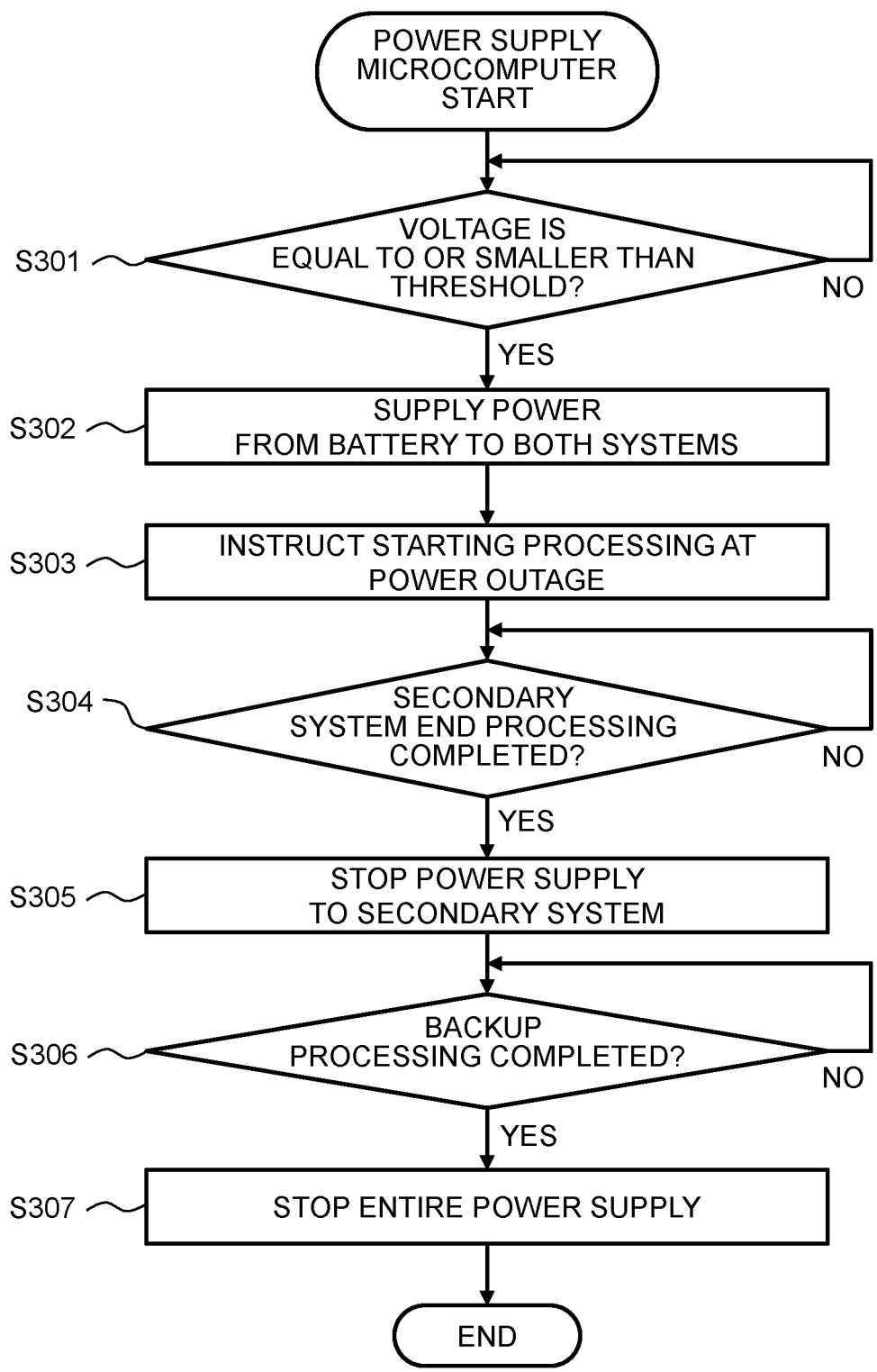
FIG. 2 is a flowchart showing processing by a power supply microcomputer.

FIG. 2 is a flowchart showing the processing of the power supply microcomputer 31. When power is supplied to the power supply port 32 of the arithmetic logic apparatus 1, the power supply microcomputer 31 starts the processing shown in FIG. 2. First, in step S301, the power supply microcomputer 31 determines whether the voltage of the power being supplied to the power supply port 32 is equal to or smaller than a threshold and detects disruption of power. In a case where the power supply microcomputer 31 determines that the voltage is equal to or smaller than the threshold, the power supply microcomputer 31 moves on to step S302, and in a case where the power supply microcomputer 31 determines that the voltage exceeds the threshold, the power supply microcomputer 31 stays on step S301. Note that hereinafter, the processing of step S301 by the power supply microcomputer 31 is also referred to as "detection processing."

In step S302, the power supply microcomputer 31 supplies power from the battery 33 to both the systems, namely, the primary system device 10 and the secondary system device 20. In the subsequent step S303, the power supply microcomputer 31 transmits an interruption notice to instruct the CPU 11 to start the processing at power outage. In the subsequent step S304, the power supply microcomputer 31 determines whether secondary system end processing has been completed. Specifically, the power supply microcomputer 31 determines whether a notice of completion of the end processing of all the apparatuses of the secondary system device 20 has been received from the CPU 11. In a case where the power supply microcomputer 31 determines that the secondary system end processing has been completed, the power supply microcomputer 31 moves on to step S305, and in a case where the power supply microcomputer 31 determines that the secondary system end processing is not completed, the power supply microcomputer 31 stays on step S304.

In step S305, the power supply microcomputer 31 halts power supply to the secondary system device 20 and moves on to step S306. In step S306, the power supply microcomputer 31 determines whether backup processing has been completed. Specifically, the power supply microcomputer 31 determines whether a notice of completion of the backup processing has been received from the CPU 11. In a case where the power supply microcomputer 31 determines that the backup processing has been completed, the power supply microcomputer 31 moves on to step S307, and in a case where the power supply microcomputer 31 determines that the backup processing is not completed, the power supply microcomputer 31 stays on step S306. In step S307, the power supply microcomputer 31 halts power supply from the battery 33 to all the apparatuses and ends the processing shown in FIG. 2.

Figure 3:
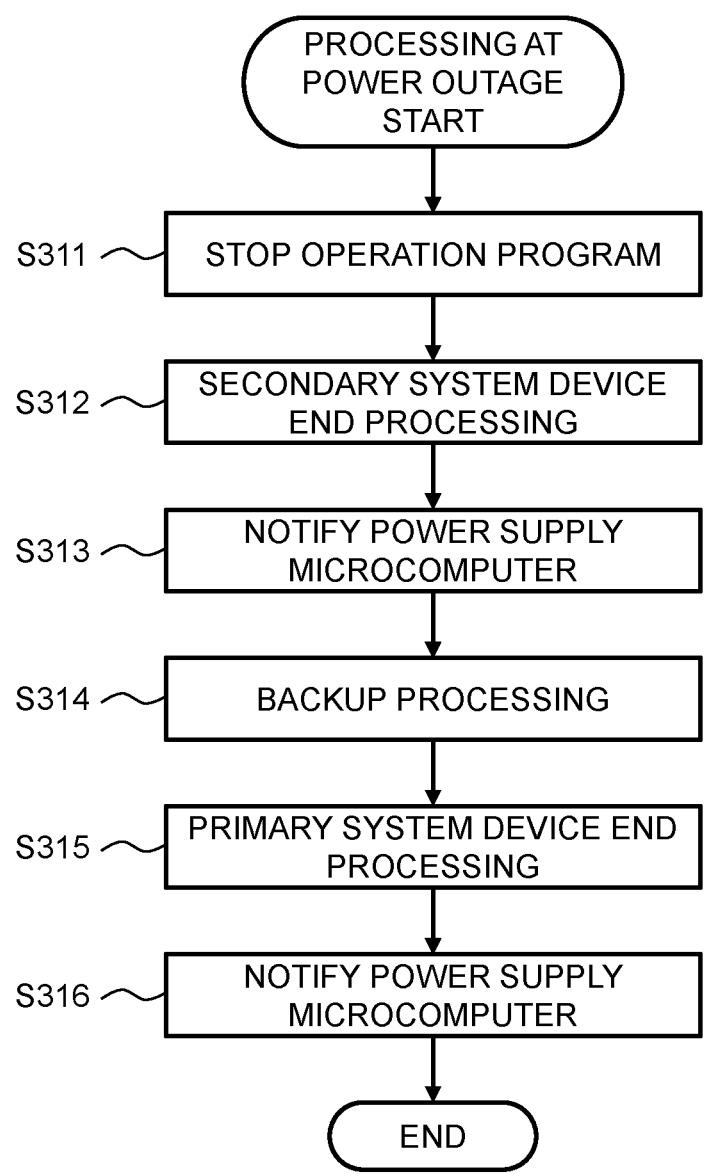
FIG. 3 is a flowchart showing processing at power outage executed by a CPU.

FIG. 3 is a flowchart showing the processing at power outage executed by the CPU 11. Upon receipt of an interruption notice from the power supply microcomputer 31, the CPU 11 starts the power outage response program to perform the processing at power outage. Note that the interruption notice is the notice in step S313 of FIG. 2. First, in step S311, the CPU 11 stops operation programs under execution. In the present step, the CPU 11 may further restrain the occurrence of other interruption processing in the CPU 11 before power supply is cut.

In the subsequent step S312, the CPU 11 performs end processing of the secondary system device 20. Specifically, the CPU 11 transmits an end command to all the apparatuses of the secondary system device 20, and upon receipt of a notice of ending from all the apparatuses of the secondary system device 20, the CPU 11 moves on to step S313. In the subsequent step S313, the CPU 11 notifies the power supply microcomputer 31 of the completion of the end processing of the secondary system device 20. In the subsequent step S314, the CPU 11 performs the backup processing. Specifically, the CPU 11 records, in the backup storage 17, data stored in the RAM 16 and data stored in a register of the CPU 11. However, in the present step, the data in the register of the CPU 11 and in the RAM 16 related to the power outage response program shown in FIG. 3 may not be recorded in the backup storage 17.

In the subsequent step S315, the CPU 11 performs end processing of the primary system device 10. In the subsequent step S316, the CPU 11 notifies the power supply microcomputer 31 of the completion of the end processing of the primary system device 10 and ends the processing shown in FIG. 3. Note that when the power supply microcomputer 31 receives the notice in step S316, the determination is YES in step S306 of FIG. 2.

Figure 4:
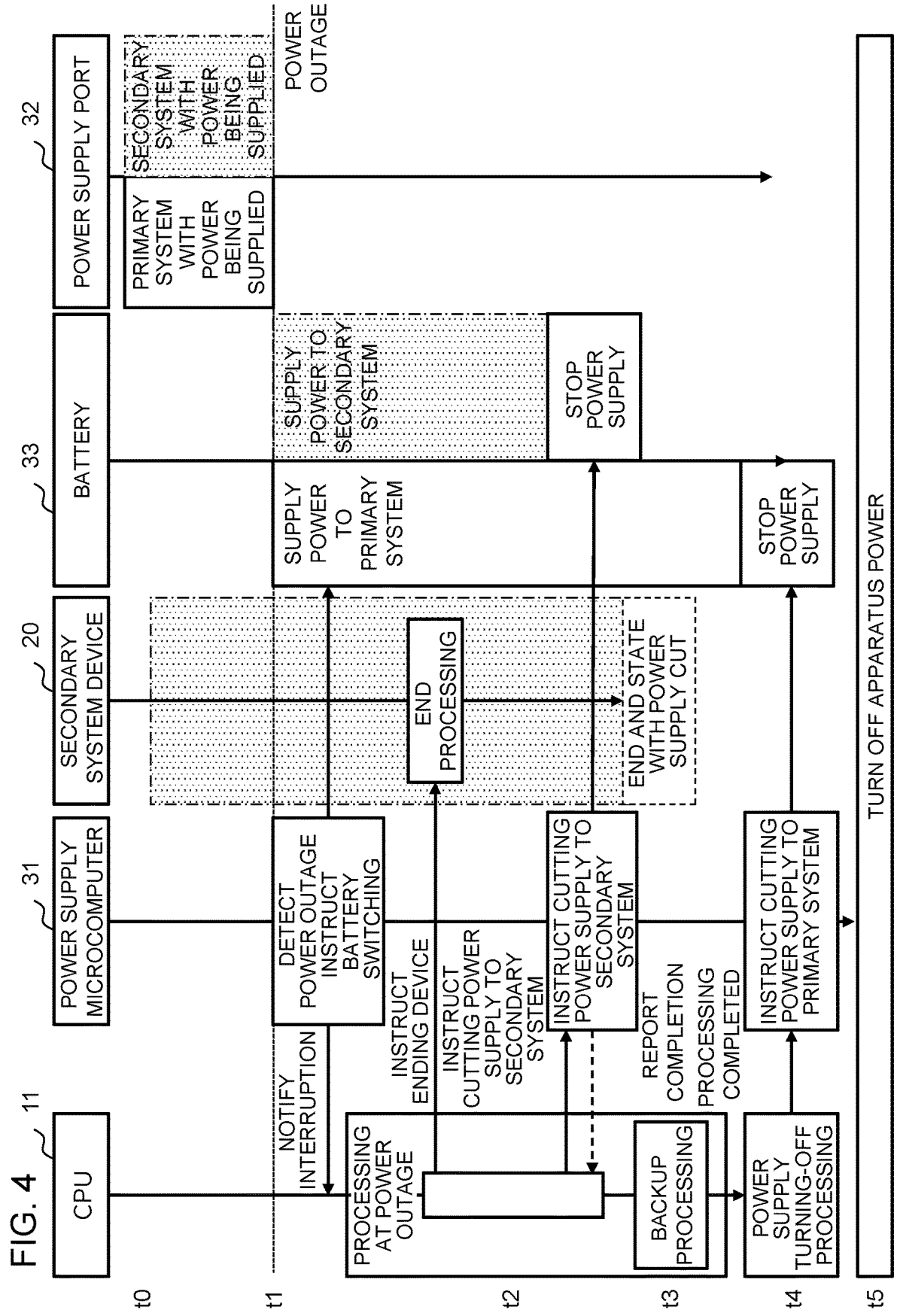
FIG. 4 is a time chart showing processing at power outage by the arithmetic logic apparatus.

FIG. 4 is a time chart showing the processing at power outage of the arithmetic logic apparatus 1. FIG. 4 shows, at the left end, t0 to t5, which are times described for convenience of explanation. In FIG. 4, the time advances from the upper side toward the lower side in the illustration. That is, of the six times, the initial time is time t0 and the last time is t5. However, in FIG. 4, the scale is not consistent for convenience in creation of the drawing. In other words, the correspondence between the length in the vertical direction and the length of time in FIG. 4 varies depending on the positions. Specifically, the length between times t1 and t2 is shown to be longer than the length between times t3 and t4, but actually, a longer period of time is more often required between times t3 and t4 than between times t1 and t2.

At time t0, the power is supplied from the outside of the arithmetic logic apparatus 1, and the power is supplied through the power supply port 32 to the primary system device 10 and the secondary system device 20. When power outage occurs at time t1, the power supply microcomputer 31 detects power outage based on the voltage in the power supply port 32 having been reduced to a threshold or smaller (S301: YES of FIG. 2). Then, the power supply microcomputer 31 performs power supply from the battery 33 to both the systems (S302) and notifies the CPU 11 of an interruption (S303).

The CPU 11 that has received the interruption notice from the power supply microcomputer 31 executes the power outage response program, and first, performs the end processing of the secondary system device 20 (S312 of FIG. 3). Upon completion of this end processing, the CPU 11 notifies the power supply microcomputer 31 (S313) of the completion, and halts power supply to the secondary system device 20 (S305) at time t2. Note that though not described in the flowchart of FIG. 2, the power supply microcomputer 31 may report to the CPU 11 that halting of power supply to the secondary system device 20 has been completed.

At time t3, the CPU 11 starts the backup processing (S314) and upon completion of this processing, performs the end processing of the primary system device 10 (S315) at time t4, and notifies the power supply microcomputer 31 (S316) of the end processing. The power supply microcomputer 31 that has received the notice determines YES in step S306 and halts entire power supply (S307), and the power of the arithmetic logic apparatus 1 is turned off at time t5.

Figure 5:
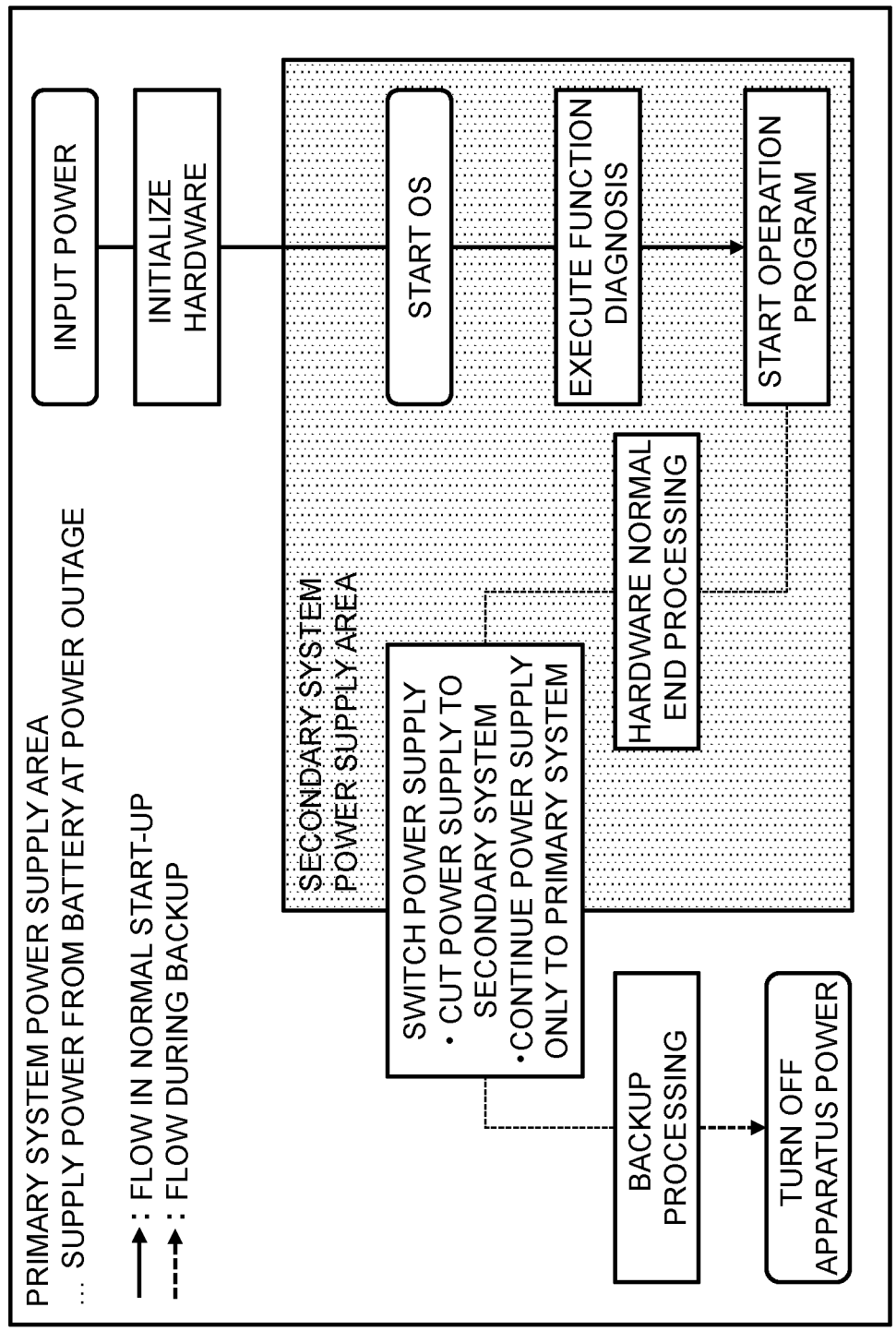
FIG. 5 is a schematic diagram showing an operation of the arithmetic logic apparatus.

FIG. 5 is a schematic diagram showing an operation of the arithmetic logic apparatus 1. Specifically, FIG. 5 shows the schematic processing from the start of the arithmetic logic apparatus 1 undergoing power outage until the power is turned off. In FIG. 5, a primary system power supply region indicates a region operated with the power supplied to the primary system device 10 and a secondary system power supply region indicates a region operated with the power supplied to the secondary system device 20. Upon input of power to the arithmetic logic apparatus 1, the CPU 11 initializes hardware by a BIOS or an EFI and starts the OS. The CPU 11 executes a function diagnosis afterwards, and then starts the operation program. When power outage occurs, the end processing of the secondary system device 20 is executed by a command of the CPU 11, with the power being supplied from the battery 33 to the secondary system device 20, and power supply to the secondary system device 20 is halted. Meanwhile, power supply to the primary system device 10 is continued. Thereafter, the CPU 11 performs the backup processing, stores necessary information in the backup storage 17, and notifies the power supply microcomputer 31 of the end of the backup, and then, the entire power of the arithmetic logic apparatus 1 is turned off by the power supply microcomputer 31.

In this manner, in the present embodiment, since after the occurrence of power outage, hardware is not initialized, the backup processing can be quickly started after the occurrence of the power outage. Further, while the backup processing is performed, power supply to the secondary system device 20 that is unnecessary for the backup processing is halted, and thus, consumption of power accumulated in the battery 33 can be saved. The capacity of data stored in the register of the CPU 11 is very small, while the RAM 16 has a capacity far larger than the capacity of the register, and requires a certain amount of time for the backup processing. Therefore, it is considered that the power expected to be consumed by the secondary system device 20 during the backup processing without ending the secondary system device 20 is greater than the power consumed during the period of time required for the end processing of the secondary system device 20, and thus, in the present embodiment, the power consumption from the occurrence of power outage to the end of the backup processing can be saved.

According to the above-described embodiment, the following function and effect can be obtained.

(1) The arithmetic logic apparatus 1, which includes the arithmetic logic part 2 having the primary system device 10 and the secondary system device 20, the power supply port 32 to which power is externally supplied, and the battery 33, executes the following method for addressing power outage. The method for addressing power outage includes: detection processing (S301 of FIG. 2) of detecting disruption of power in the power supply port 32; supplying processing (S302) of supplying power from the battery 33 to the arithmetic logic part 2 when disruption of power is detected in the detection processing; end processing (S303 to S305, S312) of performing end processing of the secondary system device 20 to reduce the power consumption of the secondary system device 20 when the supplying processing is performed; and backup processing (S314) of performing data backup using the primary system device 10 upon completion of the end processing. Accordingly, the power consumption during the backup processing after power outage can be reduced.

(2) The primary system device 10 includes the RAM 16 that is a volatile memory and the backup storage 17 that is a non-volatile memory apparatus. In the backup processing, the data stored in the RAM 16 is recorded in the backup storage 17. Therefore, the data stored in the RAM 16 is saved and can be rewritten after power outage is restored.

(3) The primary system device 10 includes the CPU 11 that is a processor and the backup storage 17. In the backup processing, the data stored in the register of the CPU 11 is recorded in the backup storage 17. Therefore, the saved data is rewritten to the register of the CPU 11 after power outage, so that the processing during the power outage can be restarted.

(4) The primary system device 10 is coupled to the primary system wiring 910. The secondary system device 20 is coupled to the secondary system wiring 920. In the end processing, after the end processing of the secondary system device 20 is performed, power supply from the battery 33 to the secondary system wiring 920 is halted. Therefore, power supply to the secondary system device 20 can be collectively halted.

(5) The arithmetic logic apparatus 1 includes the arithmetic logic part 2 having the primary system device 10 and the secondary system device 20, the power supply port 32 to which power is externally supplied, the battery 33, the power supply microcomputer 31 that also functions as a power supply control part that supplies power from the battery 33 to the arithmetic logic part 2 upon detection of disruption of power in the power supply port 32, and the CPU 11 that performs the end processing of the secondary system device 20 to reduce the power consumption of the secondary system device 20 when the power supply microcomputer 31 detects disruption of power in the power supply port 32 so as to perform data backup using the primary system device 10.

Modification 1

In the above-described embodiment, the arithmetic logic apparatus 1 includes the primary system wiring 910 that is the power wiring for the primary system device 10 and the secondary system wiring 920 that is the power wiring for the secondary system device 20. However, the arithmetic logic apparatus 1 may not include the power wiring for these two systems. In that case, the configuration may be made such that turning on and off of power supply to each power wiring can be individually set or individual switching of power supply cannot be performed. In the case where individual switching of power supply cannot be performed, the reduction of the power consumption of the secondary system device 20 is restrictive as compared to the above-described embodiment, but some reduction of the power consumption of the secondary system device 20 is expected by performing the end processing.

Modification 2

In the above-described embodiment, the primary system device 10 and the secondary system device 20 are set by a device unit. However, the primary system device 10 and the secondary system device 20 may be classified by a more detailed unit than the device unit. For example, in a case where the CPU 11 includes a plurality of arithmetic cores, the arithmetic cores may be classified into the primary system device 10 and the secondary system device 20. The specific classification is as follows.

In the case where the CPU 11 includes a plurality of arithmetic cores, one of the cores is referred to as a primary core, and the other cores are referred to as secondary cores. The primary core is treated as the primary system device 10, and the secondary cores are treated as the secondary system device 20. The plurality of arithmetic cores may be physically distinct arithmetic cores or may include virtual cores realized by Simultaneous Multithreading. In that case, the end processing in step S312 is realized by issuing a HALT command to the secondary cores. Further, when a hardware configuration capable of halting the power supply only to a part of the arithmetic cores is included, the power supply to the secondary cores may be halted in step S305.

According to a Modification 2, the following function and effect can be obtained.

(6) The primary system device 10 includes a primary core that is one core of the CPU 11 and the secondary system device 20 includes secondary cores that are all cores other than a first core in the processor. In the end processing, the power consumption of the secondary cores is reduced by issuing a HALT command to the secondary cores. In recent years, in order to improve the arithmetic capability of the CPU, a method of increasing the number of cores in one CPU package has been widely used. Meanwhile, execution of backup processing does not require enormous arithmetic capability, and the arithmetic resources become redundant. Therefore, transitioning of the cores unnecessary for the backup processing to a state consuming less power is performed by issuing the HALT command, so that the power consumption during the backup processing can be further reduced.

In the above-described embodiment and modifications, the functional block configuration is a mere example. Several functional configurations shown as separate functional blocks may be integrally configured or the configurations shown in one functional block diagram may be divided into two or more functions. In addition, a part of the function that each functional block has may be configured as being included in another functional block.

The above-described embodiment and modifications may be combined with one another. In the above description, various embodiment and modifications have been described, but the present invention is not limited to these contents. Other aspects that are conceivable within the technical idea of the present invention are also included in the scope of the present invention.

What is claimed is:

1. A method for addressing power outage of an arithmetic logic apparatus including an arithmetic logic part, a power supply port to which power is externally supplied, and a battery,
    the arithmetic logic part including a primary system device and a secondary system device,
    the method comprising:
    detection processing of detecting disruption of power in the power supply port;
    supplying processing including supplying power from the battery to the arithmetic logic part when the disruption is detected in the detection processing;
    end processing including performing processing of halting supply of power to the secondary system device to reduce power consumption of the secondary system device when the supplying processing is performed; and
    backup processing of performing data backup using the primary system device upon completion of the end processing,
    wherein the secondary system device includes an interface I/O module, a non-volatile memory apparatus storing operation programs executed by a processor of the primary system device, an LAN controller, a circuit for outputting information of the arithmetic logic apparatus, and a communication I/O for realizing a serial communication or a parallel communication, and
    wherein, during the end processing, the supply of power is halted to the I/O module, the non-volatile memory apparatus, the LAN controller, the circuit, and the communication I/O.

2. The method for addressing power outage according to claim 1, wherein the primary system device includes a primary core that is one core of the processor, and the secondary system device includes secondary cores that are all cores other than the primary core in the processor, and
    wherein, in the end processing, power consumption of the secondary cores is reduced by issuing a HALT command to the secondary cores.

3. The method for addressing power outage according to claim 1, wherein the primary system device includes a volatile memory and a storage apparatus that is a non-volatile memory apparatus, and
    wherein, in the backup processing, data stored in the volatile memory is recorded in the storage apparatus.

4. The method for addressing power outage according to claim 1, wherein the primary system device includes the processor and a storage apparatus that is a non-volatile memory apparatus, and
    wherein, in the backup processing, data stored in a register of the processor is recorded in the storage apparatus.

5. The method for addressing power outage according to claim 1, wherein the primary system device is coupled to a first power supply system,
    wherein the secondary system device is coupled to a second power supply system, and
    wherein, in the end processing, after performing the processing of ending the secondary system device, power supply from the battery to the second power supply system is halted.

6. An arithmetic logic apparatus comprising:
    an arithmetic logic part including a primary system device and a secondary system device;
    a power supply port to which power is externally supplied;
    a battery;
    a power supply control part that supplies power from the battery to the arithmetic logic part when disruption of power is detected in the power supply port; and
    a central processing part that performs halting supply of power to the secondary system device to reduce power consumption of the secondary system device when the arithmetic logic part is supplied with power from the battery, and to perform data backup using the primary system device,
    wherein the secondary system device includes an interface I/O module, a non-volatile memory apparatus storing operation programs executed by a processor of the primary system device, an LAN controller, a circuit for outputting information of the arithmetic logic apparatus, and a communication I/O for realizing a serial communication or a parallel communication, and
    wherein, during the halting, the central processing part halts the supply of power to the I/O module, the non-volatile memory apparatus, the LAN controller, the circuit, and the communication I/O.

* * * * *